United States Patent Office 3,701,751
Patented Oct. 31, 1972

3,701,751
FIBER REINFORCED MODIFIED
POLYOLEFIN COMPOSITIONS
Charles H. Schramm, Ridgewood, Albert Schrage, East Orange, and Philip D. Readio, Rockaway, N.J., assignors to Dart Industries, Inc., Los Angeles, Calif.
No Drawing. Filed Oct. 16, 1970, Ser. No. 81,527
Int. Cl. C08f 45/10; C08k 1/14
U.S. Cl. 260—41 A
10 Claims

ABSTRACT OF THE DISCLOSURE

Enhanced physical properties are obtained with the fiber reinforced modified polyolefin compositions. The modified polyolefin compositions comprise the reaction product of a polyolefin and a polymerizable compound containing a terminal

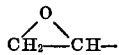

group and a terminal vinyl group.

DISCLOSURE

This invention relates to fiber reinforced modified polyolefin compositions having improved physical properties.

Polyolefins, such as polyethylene, polypropylene, polybutene-1, poly(4-methyl-pentene-1), ethylene-propylene copolymers, and the like, are generally known to possess desirable properties for fabrication, by molding, extrusion and casting techniques, into a variety of articles. However, polyolefins also possess a characteristic inertness which renders them difficult to treat, such as by dyeing, metalizing, and the like, and possess what may be generally referred to as resistance to physical or chemical bonding to other materials. This inertness is a particular problem in connection with fiber or particle reinforced polyolefins which are of considerable interest in fabricating a variety of articles due to their ability to be fabricated by plastics forming techniques. The problem arises in that the maximum increase in physical properties of these reinforced compositions is limited due to insufficient adhesive attraction or bonding between the polyolefins and the reinforcing fibers.

In accordance with this invention there is provided a fiber reinforced modified polyolefin composition having improved physical properties. The modified polyolefin composition useful in the invention comprises the reaction product of a polyolefin and about 0.01 to 10 wt. percent based on the polyolefin of a polymerizable compound having a terminal

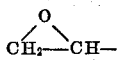

group and a terminal vinyl group according to the following formula

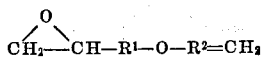

wherein $R^1$ is a cyclic, straight or branched chain alkylene group having 1 to 20 carbon atoms;

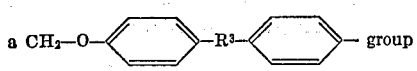

wherein $R^3$ is a straight or branched chain alkylene radical having 1 to 10 carbon atoms, oxygen, sulfur, amino,

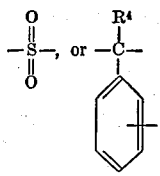

wherein $R^4$ is H or lower alkyl and $R^5$ is lower alkyl;

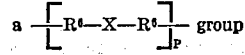

wherein each $R^6$ is a straight or branched chain lower alkylene, X is an amino group or an oxygen or sulfur atom, and $p$ is an integer of 1 to 20;

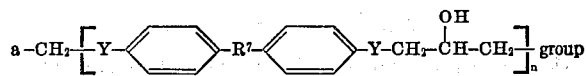

wherein Y represents oxygen or sulfur atoms, $R^7$ is a straight or branched chain alkylene radical having 1 to 10 carbon atoms,

oxygen, sulfur or

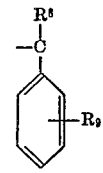

wherein $R^8$ is H or lower alkyl and $R^9$ is lower alkyl; and $n$ is an integer of 1 to 20;

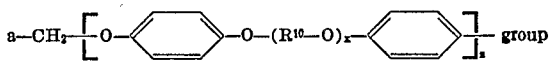

wherein $R^{10}$ is lower alkyl, $x$ is an integer of 1–10 and $z$ is an integer of 1–10;

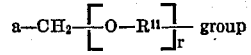

wherein $R^{11}$ is lower alkyl and $r$ is an integer of 1–100;

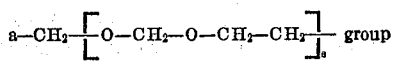

wherein $s$ is an integer of 1 to 100; and $R^2$ is a group represented by

wherein $R^{12}$ is H or $CH_3$

By way of specific examples of some of the above described polymerizable compounds there may be mentioned glycidyl acrylate; glycidyl methacrylate; the acrylic and methacrylic esters of the monoglycidyl ether of sulfonyl bisphenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of α,α-bis(p-hydroxyphenyl) tolylethane; the acrylic and methacrylic esters of 3-oxy-6,7-epoxyheptanol, 3 aza-6,7-epoxyheptanol and 3-thia-6,7-epoxyheptanol; the reaction products of one mole of acrylic or methacrylic acid with one mole of polyphenylenesulfide diglycidyl ether, polyphenyleneamine diglycidyl ether, or polyphenyleneoxide diglycidyl ether; the reaction products of one mole of acrylic acid or methacrylic acid with one mole of the polycondensation product of epichlorohydrin with sulfonyl bis (phenylmercaptan) or sulfonyl bisphenol; the reaction products of one mole of acrylic acid or methacrylic acid with one mole of the polycondensation product of epichlorohydrin with α,α-bis (p-hydroxy-phenyl) totylethane or α,α-bis (p-thiophenyl) tolylethane; the acrylic and methacrylic esters of poly ($C_1$–$C_4$ alkyleneoxide glycol) monoglycidyl ether; and the acrylic and methacrylic esters of poly [(alkylene-co-phenylene-oxide) glycol] monoglycidyl ether. These latter two groups of ester compounds are known, however the remaining compounds are believed novel and also form a part of this invention.

The polymerizable compounds may be synthesized according to general techniques of chemistry well known in the art. For example, some of these compounds may be prepared according to the following outline of general preparations:

Compounds of the structure

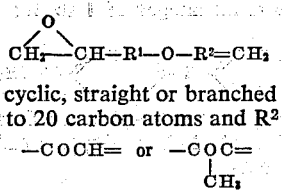

wherein $R^1$ is a cyclic, straight or branched chain alkylene group having 1 to 20 carbon atoms and $R^2$ is —COCH= or —COC=
             |
             CH₃ may be generally prepared by epoxidizing a corresponding omega-chloro-alpha-olefin followed by reaction with the sodium salt of acrylic acid or methacrylic acid. The omega-chloro-alpha-olefin may be easily prepared using general chemistry concepts by those skilled in the art once the desired compound is determined.

Compounds of the structure

wherein $R^1$ is a

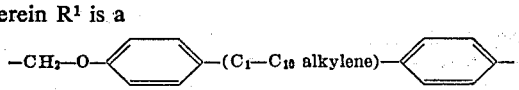

group and $R^2$ is

—COCH= or —CO—C=
              |
              CH₃ may be generally prepared by reacting phenol with an alkylene dichloride in the presence of $AlCl_3$ to form an alkylene bisphenol which is, in turn, reacted with epichlorohydrin in the presence of NaOH to form the monoglycidyl ether of the alkylene bisphenol. They may then be reacted with acryloyl chloride or methacryloyl chloride in the presence of pyridine to produce the desired compound.

Compounds of the structure

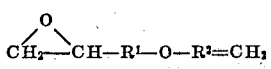

wherein $R^1$ is

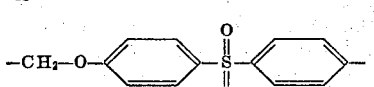

and $R^2$ is

CH₃
          |
—COCH= or COC= may be prepared by reacting phenol with $SO_2Cl_2$ in the presence of $AlCl_3$ to form sulfonyl bisphenol which, in turn, is then reacted with epichlorohydrin in the presence of NaOH to form the monoglycidyl ether of sulfonyl bisphenol. This is then reacted with acryloyl chloride or methacryloyl chloride in the presence of pyridine to produce the desired compound.

Compounds of the structure

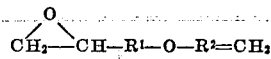

wherein $R^1$ is

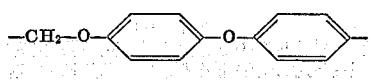

and $R^2$ is

—COCH= or —COC=
             |
             CH₃ may be prepared by reacting diphenylether with bromine to form dibromodiphenylether which is then treated with caustic to form oxybisphenol. This is reacted with epichlorohydrin in the presence of NaOH to form the monoglycidyl ether of oxybisphenol. Reaction of this with either acryloyl chloride or methacryloyl chloride in the presence of pyridine produces the desired compound.

Compounds of the structure

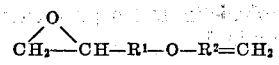

wherein $R^1$ is

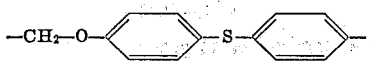

and $R^2$ is

—COCH= or —COC=
             |
             CH₃ may be prepared by reacting phenol with $SCl_2$ in the presence of $AlCl_3$ to form thiobisphenol which is then reacted with epichlorohydrin to form the monoglycidyl ether of thiobisphenol. This is reacted with either acryloyl chloride or methacryloyl chloride in the presence of pyridine to form the desired compound.

Compounds of the structure

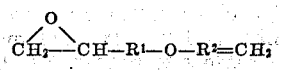

wherein $R^1$ is

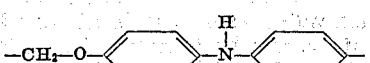

and $R^2$ is

—COCH— or —COC=
             |
             CH₃ may be prepared by reacting diphenylamine with bromine to form dibromodiphenylamine which is then hydrolyzed with caustic to form aminobisphenol. This is then reacted with epichlorohydrin to form the monoglycidyl ether of amino bisphenol. Reaction of this intermediate with acryloyl chloride or methacryloyl chloride in the presence of pyridine results in the desired compound.

Compounds of the structure

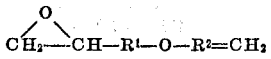

wherein $R^1$ is

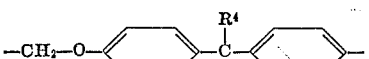

($R^4$ is H or lower alkyl and $R^5$ is lower alkyl) and $R^2$ is

—COCH= or —COC=
             |
             CH₃ may be prepared by reacting benzene or an alkyl benzene with acetylchloride or an alkylacetylchloride in the presence of AlCl₃ to form a ketone reaction product which is then reacted with phenol in the presence of AlCl₃ to form the corresponding α,α-bis (p-hydroxyphenyl) aryl substituted ethane. This is then reacted with epichlorohydrin on a 1/1 molar basis in the absence of water to form the monoglycidyl ether product which upon further reaction with acryloyl chloride or methacryloyl chloride results in the desired product.

Compounds of the structure

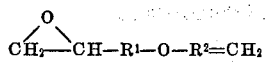

wherein R¹ is —(lower alkylene)—O—(lower alkylene)— and R² is

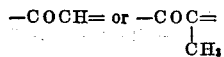

may be prepared by reducing an alkene aldehyde (e.g. crotonaldehyde) to the corresponding alkene alcohol (e.g. crotyl alcohol) followed by the reaction with an alkylene chlorohydrin in the presence of NaOH to form a first intermediate which is reacted with HOCl to form a second intermediate followed by treatment with NaOH to form product which is then reacted with acryloyl chloride or methacryloyl chloride in the presence of pyridine to produce the desired compound.

Compounds of the structure

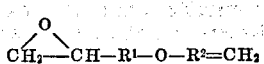

wherein R¹ is

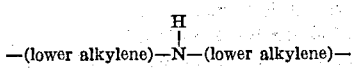

and R² is

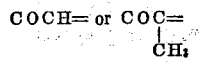

may be prepared by reacting an alkene alcohol with SOCl₂ followed by reacting the resulting reaction product with an aminoalkanol to produce a first intermediate. This is then reacted with HOCl to form a second intermediate and then treated with NaOH to form a product which is then reacted with acryloyl chloride or methacryloyl chloride in the presence of pyridine to produce the desired product.

Compounds of the structure

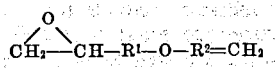

wherein R¹ is —(lower alkylene)—S—(lower alkylene)— and R² is

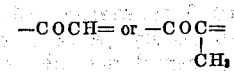

may be prepared by reacting an alkene alcohol with SOCl₂ followed by reacting the resulting reaction product with a mercaptoalkanol to produce a first intermediate. This is then reacted with HOCl to form a second intermediate and then treated with NaOH to form a product which is then reacted with acryloyl chloride or methacryloyl chloride in the presence of pyridine to produce the desired product.

Compounds of the structure

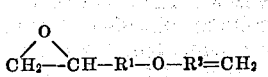

wherein R¹ is

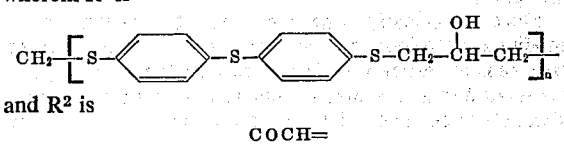

and R² is

or

may be prepared by reacting SCl₂ and phenylmercaptan in the presence of AlCl₃ and reacting the resulting product with epichlorohydrin in aqueous NaOH followed by reaction with acrylic or methacrylic acid to produce the desired compound.

Compounds of the structure

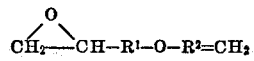

wherein R¹ is

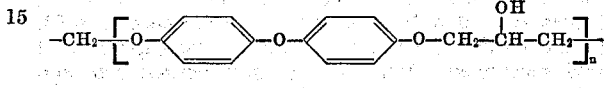

and R² is

or

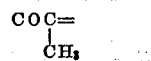

may be prepared by brominating diphenyl ether followed by treatment with magnesium, then oxygen and then water. The resulting product is then reacted with epichlorohydrin in aqueous NaOH followed by reaction with acrylic or methacrylic acid to produce the desired compound.

Compounds of the structure

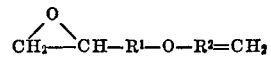

wherein R¹ is

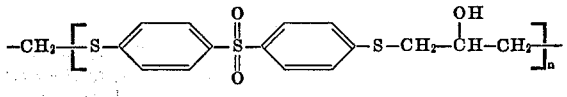

and R² is

or

may be prepared by reacting phenylmercaptan with acetic anhydride to produce phenylthioacetate which is reacted with SOCl₂ in the presence of AlCl₃ to yield sulfonyl bis (phenylthioacetate). This is converted to sulfonyl bis-(phenylmercaptan) by treatment with NaOH. This is then reacted with epichlorohydrin in aqueous NaOH to form the polycondensation product followed by reaction with acrylic or methacrylic acid to produce the desired compound.

Compounds of the structure

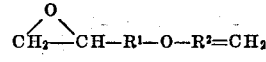

wherein R¹ is

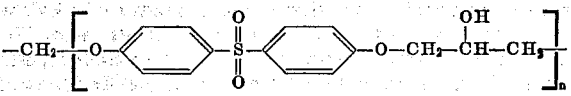

and R² is

may be prepared by reacting phenol with SO₂Cl₂ in the presence of AlCl₃ to form sulfonyl bisphenol. This is reacted with epichlorohydrin in aqueous NaOH to form the polycondensation product followed by reaction with acrylic or methacrylic acid to produce the desired compound.

Compounds of the structure

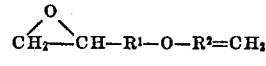

wherein $R^1$ is

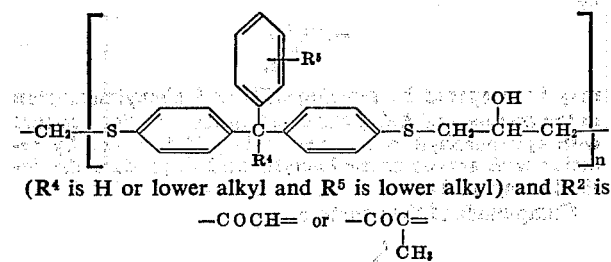

($R^4$ is H or lower alkyl and $R^5$ is lower alkyl) and $R^2$ is $$-COCH= \text{ or } -COC=$$
$$\phantom{-COCH= \text{ or } -CO}|$$
$$\phantom{-COCH= \text{ or } -COC}CH_3$$

may be prepared by reacting benzene or an alkylbenzene with acetylchloride or an alkyl acetylchloride in the presence of $AlCl_3$ to form a ketone reaction product which is then reacted with thiophenol in the presence of $AlCl_3$ to form the corresponding $\alpha,\alpha$-bis (p-mercaptophenyl) aryl substituted ethane. This is then reacted with epichlorohydrin in aqueous NaOH to form the polycondensation product which is, in turn, reacted with acrylic acid or methacrylic acid to form the desired compound.

Compounds of the structure $$CH_2\text{—}CH\text{—}R^1\text{—}O\text{—}R^2=CH_2$$
$$\phantom{CH_2}\diagdown O \diagup$$

wherein $R^1$ is

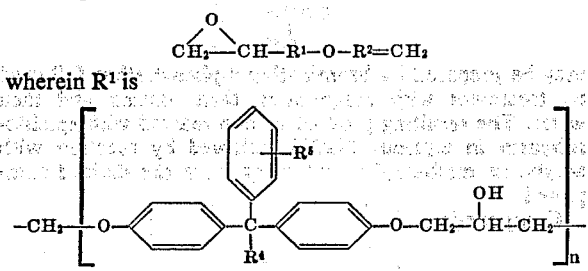

and $R^2$ is $$-COCH= \text{ or } -COC=$$
$$\phantom{-COCH= \text{ or } -CO}|$$
$$\phantom{-COCH= \text{ or } -COC}CH_3$$

may be prepared by reacting benzene or an alkyl benzene with acetylchloride or an alkyl acetyl chloride in the presence of $AlCl_3$ to form a ketone reaction product which is then reacted with phenol in the presence of $AlCl_3$ to form the corresponding $\alpha,\alpha$-bis (p-hydroxyphenyl) aryl substituted ethane. This is then reacted with epichlorohydrin in aqueous NaOH to form the polycondensation product which is, in turn, reacted with acrylic or methacrylic acid to form the desired compound.

Compounds of the structure $$CH_2\text{—}CH\text{—}R^1\text{—}O\text{—}R^2=CH_2$$
$$\phantom{CH_2}\diagdown O \diagup$$

wherein $R^1$ is

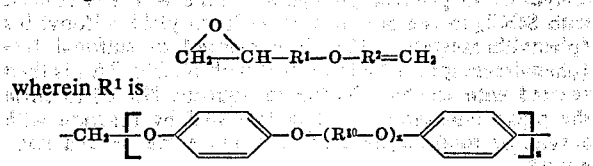

group (wherein $R^{10}$ is lower alkyl, $x$ is 1–10 and $z$ is 1–10) and $R^2$ is $$-COCH= \text{ or } -COC=$$
$$\phantom{-COCH= \text{ or } -CO}|$$
$$\phantom{-COCH= \text{ or } -COC}CH_3$$

may be prepared by copolymerizing a mixture of alkylene and arylene glycols in the presence of sulfuric acid. The copolymer product is then reacted with epichlorohydrin on a 1/1 molar basis in the presence of NaOH followed by reaction with either acryloyl chloride or methacryloyl chloride in the presence of pyridine to produce the desired compound.

Compounds of the structure $$CH_2\text{—}CH\text{—}R^1\text{—}O\text{—}R^2=CH_2$$
$$\phantom{CH_2}\diagdown O \diagup$$

wherein $R^1$ is

($R^{11}$ is lower alkyl and $r$ is an integer of 1–100) and $R^2$ is $$-COCH= \text{ or } -COC=$$
$$\phantom{-COCH= \text{ or } -CO}|$$
$$\phantom{-COCH= \text{ or } -COC}CH_3$$

may be prepared by reacting on a 1/1 molar basis the corresponding poly (alkylene glycol) and epichlorohydrin in the presence of NaOH followed by reaction of the product with acryloyl chloride or methacryloyl chloride in the presence of pyridine to produce the desired compound.

Compounds of the structure $$CH_2\text{—}CH\text{—}R^1\text{—}O\text{—}R^2=CH_2$$
$$\phantom{CH_2}\diagdown O \diagup$$

wherein $R^1$ is

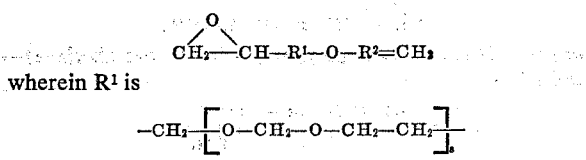

($s$ is an integer of 1–100) and $R^2$ is $$-COCH= \text{ or } -COC=$$
$$\phantom{-COCH= \text{ or } -CO}|$$
$$\phantom{-COCH= \text{ or } -COC}CH_3$$

may be prepared by reacting poly(dioxolane) with epichlorohydrin on a 1/1 molar basis in the presence of NaOH followed by reaction with acryloyl chloride or methacryloyl chloride in the presence of pyridine to produce the desired compound.

The polyolefins which may be modified with the above described polymerizable compound include homopolymers and copolymers of alpha-olefins having 2–10 carbon atoms and mixtures thereof. These polymers are well known and include, by way of example, polyethylene, polypropylene, polybutene-1, poly (4-methyl-pentene-1), poly (3-methylbutene-1), copolymers of propolylene and ethylene, copolymers of propylene or ethylene with butene-1, and the like.

In general, the modified polyolefin composition useful in this invention may be prepared by merely mixing the polyolefin and the polymerizable compound having a terminal $$CH_2\text{—}CH\text{—}$$
$$\diagdown O \diagup$$

group and terminal vinyl group and subjecting the mixture to polymerization reaction conditions using free radical initiation or irradiation methods. It is believed that the resulting composition is a graft polymer of the polyolefin and polymerizable compound.

Free radical initiators suitable for the preparation include the peroxide-type initiators as well as azo-type initiators all of which are well known. These include both organic and inorganic peroxides or hydroperoxides as well as aliphatic or cycloaliphatic azo compounds. Mixtures of these may be used. Some examples of suitable initiators include 2,4-dichlorobenzoyl peroxide; benzoyl peroxide; caproyl peroxide; lauroyl peroxide; t-butyl peroxyisobutyrate; p-chlorobenzoyl peroxide; diisopropyl peroxydicarbonate; acetyl peroxide; decanoyl peroxide; t-butyl peroxypivalate; t-butyl peracetate; t-butyl perbenzoate; cumyl peroxide; diethyl dioxide; t-butyl hydroperoxide; methyl ethyl ketone peroxide; di-t-butyl diperoxyphthalate; hydroxyheptyl peroxide; cyclohexanone peroxide; p-methane hydroperoxide; pinane hydroperoxide; cumene hydroperoxide; t-butyl peroxide; 2,5-dimethylhexane-2,5-dihydroperoxide; t-butyl peroctoate; 2,5-dimethylhexane-2,5-disperoxybenzoate; 2,2$^1$-azoisobutyronitrile; 2,2$^1$-azo-2-methylbutyronitrile; dimethyl 2,2$^1$-azoisobutyrate; p-methoxy benzene diazo thio 2-naphthyl ether, $\alpha,\alpha$-azodiisobutyrocarbonamide; 1,1-azodicyclohexane-carbonitrile; and the like.

More specifically, one technique for preparing the modified polyolefin composition involves dissolving the free radical initiator or initiators and the polymerizable compound in a common solvent such as benzene or methylene chloride. Thereafter, the polyolefin in particle form is added to the solution and the mixture is slurried followed by evaporation of the solvent. The resulting material, polyolefin particles coated and possibly impregnated with the free radical initiator and the polymerizable compound, is then fed to a mixing apparatus such as a Brabender Plastograph or an extruder whereupon heat is applied to melt the polyolefin and decompose the initiator and wherein the mixture undergoes essentially simultaneous homogenization while the reaction proceeds. The resulting modified polyolefin composition is then solidified by cooling and comminuted or granulated in a known manner. Rather than slurrying the materials together in a solvent prior to adding them to the equipment they may be alternatively premixed by tumbling or even fed directly to the equipment without being premixed.

In another technique for preparing the modified polyolefin composition the polyolefin in particle form is physically mixed with the free radical initiator and the polymerizable compound either by tumbling or the aforementioned slurrying method followed by heating to polymerization conditions which are sufficient to decompose the initiator and promote the reaction but insufficient to melt the polyolefin. In this technique it is preferable that the polyolefin be in finely divided form, e.g. powder, so as to provide a high surface area available for reaction.

The temperatures employed during the polymerization reaction will, in part, depend on the particular technique followed as well as the particular free radical initiator utilized. For example, in the Brabender or extrusion technique the temperatures must be such that the polymer becomes melted but not so high as to cause unnecessary degradation of the polymer. It has been found suitable to employ a temperature which does not exceed about 20° C. above the melting point of the particular polymer involved. Of course, in this technique it is also desirable to employ a free radical catalyst that has a satisfactory decomposition rate at the desired temperature. This may be readily ascertained by those skilled in the art based on the half-lives of the free radical catalysts (see U.S. 3,293,233).

When employing the other described technique for preparing the composition wherein the reaction is carried out in the presence of solid polymer the temperatures employed may vary from room temperature up to a point whereat melting of the polymer does not occur. Again the free radical initiator should be selected to provide a satisfactory decomposition rate at the particular temperature desired as is known in the art.

Whenever a technique is used in preparing the composition that involves heating of the polymer it is desirable to conduct the process in an inert atmosphere, e.g. nitrogen, so as to minimize oxidative degradation. In addition, to offset some of the problems of degradation of the polymer during the preparation of the modified composition it is possible to prestabilize the polymer with conventional heat stabilizers, UV inhibitors and the like.

The reinforcement of the modified polyolefin compositions may be with fibrous materials such as asbestos, glass fibers, and other synthetic or natural fibers. Glass fibers may be in the form of short fibers, continuous rovings, glass fiber mat and the like when preparing the compositions of the invention. Although the improvements of this invention are achieved with unsized glass fibers it is preferred that the glass fibers be sized with any conventional sizing such as polyvinyl acetate, the silane type sizings, and the like. Due to the improved adhesiveness characteristics of the modified polyolefin composition it is believed that improved bonding takes place between the fibrous material, particularly glass, and the composition. As a result it has been found that substantially increased physical properties are obtained in the reinforced compositions. Of particular improvement are the tensile and flexural properties of the reinforced compositions. The reinforcement in these compositions may amount to 5 to 90 wt. percent of the overall composition, particularly when glass fibers are employed as the reinforcement. Preferably, the reinforcement is 10 to 50 wt. percent.

The reinforcing material may be incorporated into the modified polyolefin composition using a variety of known techniques ranging from simple blending techniques to coating operations. Suitable processes are disclosed in U.S. 3,416,990, U.S. 3,453,356 and 3,042,570 wherein these types of compositions are prepared for use in molding and extrusion operations. The reinforced compositions of the invention may also include additives such as fillers, pigments, stabilizers, antioxidants, slip agents, antistatic agents, mold release agents, flame retardant compounds, and the like.

The following examples will further illustrate the invention:

Example 1

(A) Composition of the inventions.—A dry mix was prepared by tumbling together 100 g. polypropylene powder, 0.5 g. glycidyl acrylate (commercially available) and 1.0 g. benzoyl peroxide (dry). The mix was divided into three portions. Each portion was charged to a Brabender Plastograph preheated to about 210–215° C. Upon addition of each portion the Brabender cooled to about 170° C. and during the course of the reaction lasting about 10 minutes the temperature gradually increased to about 189–191° C. The reaction products from each Brabender charge were combined and ground to a particle form in a Wiley mill. The product was then extracted with methyl ethyl ketone to remove any homopolymer of glycidyl acrylate that may have formed plus any other soluble by-products. The reaction product was then dry mixed with 20 wt. percent ¼ inch chopped glass fibers (OCF 885) and fed to a 1″ extruder and extruded through a single ⅛ inch orifice into a strand which was then solidified and severed into segments (pellets). These pellets were injection molded into specimens for determination of flexural strength and flexural modulus in accordance with ASTM D–790–66. The results of the test were as follows:

Flexural strength [1] (p.s.i.) _____ $1.6 \times 10^4$
Flexural modulus (p.s.i.) _____ $5.24 \times 10^{-5}$

[1] Fail point.

(B) Comparative compositions.—For comparison with (A), two compositions were prepared, one of which comprises polypropylene (same lot as in A) containing 20 wt. percent ¼ inch chopped glass fibers (OCF–885) while the other comprised a blend of polypropylene (same lot as in A) and homopolymer of glycidyl acrylate (200 parts by weight/1 part by weight) containing 20 wt. percent ¼ inch chopped glass fibers (OCF–885). These compositions were blended in the same manner as described in Example 1 using a 1 inch extruder followed by pelletizing. The homopolymer of glycidyl acrylate was prepared by polymerizing the monomer in the presence of benzoyl peroxide. Each of the above described compositions were injection molded into specimens for testing in accordance with ASTM D–790–66 with the following results obtained:

| Composition | Flexural strength [1] (p.s.i.) | Flexural modulus (p.s.i.) |
| --- | --- | --- |
| Polypropylene plus 20 wt. percent glass fibers | $1.06 \times 10^4$ | $4.48 \times 10^{-5}$ |
| Blend of polypropylene and homopolymer of glycidyl acrylate plus 20 wt. percent glass fibers | $1.13 \times 10^4$ | $5.07 \times 10^{-5}$ |

[1] Yield.

From the data appearing in the above comparison it is clearly shown that the compositions of this invention possess unexpected improvements in physical properties.

Example 2

A series of compositions of this invention were prepared and evaluated against glass reinforced unmodified polypropylene relative to the flexural properties of the reinforced compositions.

The compositions of this invention were prepared by adding the polymerizable compound and the free radical initiator (benzoyl peroxide) to polypropylene particles using a slurry technique employing methylene chloride followed by removal of the solvent under vacuum. The resulting mixture, in each case, was then charged to a Brabender followed by reaction in a manner as described in Example 1(A). The reaction product was then solidified by cooling and ground in a Wiley mill. The reaction product was then reinforced with 20 wt. percent ¼ inch chopped glass fibers (OCF-885) using a 1 inch extruder followed by pelletizing of the reinforced composition. The reinforced composition was then injection molded into specimens for determination of flexural strength and flexural modulus in accordance with ASTM D-790-66.

In the following table the results obtained by these evaluations are listed. Each composition of this invention is indicated in terms of the quantity of polypropylene and quantity of polymerizable compound used in the preparation including the type of polymerizable compound. One part benzoyl peroxide was used as the free radical initiator in each sample.

TABLE I

[Compositions Contain 20 wt. percent Glass Fibers]

| Sample No. | Parts by Weight | | | P.s.i. | |
|---|---|---|---|---|---|
| | Polypropylene | Glycidyl acrylate | Glycidyl methacrylate | Flexural strength* | Flexural modulus ($\times 10^{-5}$) |
| A | 100 | 5 | | 13,500 | 4.8 |
| B | 100 | 5 | | 12,900 | 4.9 |
| C | 100 | 5 | | 11,800 | 5.2 |
| Average of A, B and C samples≈ | | | | 12,700 | 5.0 |
| D | 100 | | 5 | 12,000 | 4.4 |
| E | 100 | | 5 | 11,600 | 5.1 |
| F | 100 | | 5 | 10,200 | 4.5 |
| Average of D, E and F samples≈ | | | | 11,300 | 4.7 |
| G | 100 | 10 | | 10,300 | 3.9 |
| H | 100 | 2.5 | | 12,300 | 4.7 |
| I | 100 | 1.25 | | 13,600 | 4.8 |
| J | 100 | 1.0 | | 13,100 | 4.7 |
| K | 100 | 0.5 | | 15,400(F) | 5.2 |
| L | 100 | 0.5 | | 12,000 | 4.2 |
| M | 100 | 0.5 | | 12,200 | 5.0 |
| N | 100 | 0.5 | | 13,700(F) | 5.1 |
| Average of K, L, M and N samples≈ | | | | 13,300 | 4.9 |
| O | 100 | 0.25 | | 12,900 | 4.7 |
| P | 100 | 0.25 | | 14,900 | 4.7 |
| Average O and P samples≈ | | | | 13,900 | 4.7 |
| Q | 100 | | 10 | 11,400 | 5.2 |
| R | 100 | | 2.5 | 11,700 | 5.3 |
| S | 100 | | 1.25 | 11,600 | 5.2 |
| T | 100 | | 0.5 | 13,000 | 4.9 |
| U | 100 | | 0.25 | 12,900 | 4.7 |

*Flexural strength is at yield unless noted (F) whereby the value is then at fail which occurred before any yield point was reached during test.

For comparison with the above compositions a series of fourteen glass fiber reinforced polypropylene compositions were prepared from several lots of unmodified polypropylene using 20 wt. percent ¼ inch chopped glass fibers followed by testing in accordance with ASTM D-790-66 in the same manner as described above in connection with the compositions of this invention. The average results from these fourteen evaluations were as follows:

Flexural strength (p.s.i.) _____ 10,100
Flexural modulus (p.s.i.) ($\times 10^{-5}$) _____ 4.7

The above examples demonstrate the improvements achieved with the compositions of this invention.

The compositions of this invention are useful in forming a variety of shaped articles using conventional molding and extrusion techniques. Such articles would possess the improvements provided by the invention. Due to the nature of the reinforced compositions it is also possible to coat the resulting shaped articles with a variety of polar materials whereby enhanced physical and chemical bonding between the coating and the substrate would be achieved. This would include metallizing.

Thus having described the invention in full and complete detail it will be understood by those skilled in the art that certain variations and modifications may be made without departing from the spirit and scope of the invention as described herein and in the appended claims.

We claim:

1. A reinforced composition comprising
 (A) about 5 to 90 wt. percent of fibrous material selected from glass and asbestos, and
 (B) 10 to 95 wt. percent of the reaction product derived from
   (1) a polyolefin selected from the group consisting of homopolymers of $C_2$-$C_{10}$ alpha olefins, copolymers of $C_2$-$C_{10}$ alpha olefins, and mixtures thereof, and
   (2) about 0.01 to about 10 wt. percent based on the polyolefin of a polymerizable compound having the formula

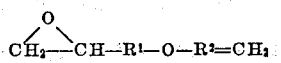

wherein
 $R^1$ is a cyclic, straight or branched chain alkylene group having 1 to 20 carbon atoms;

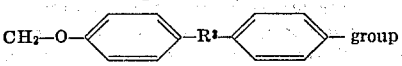  group wherein $R^3$ is a straight or branched chain alkylene radical having 1 to 10 carbon atoms, oxygen, sulfur,

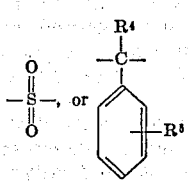

wherein $R^4$ is H or lower alkyl and $R^5$ is lower alkyl;

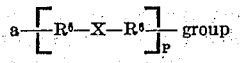  group wherein each $R^6$ is a straight or branched chain lower alkylene, X is an oxygen or sulfur atom, and $p$ is an integer of 1 to 20;

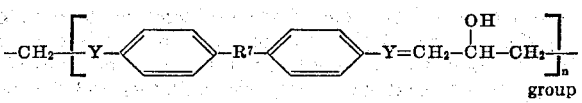

group wherein Y represents oxygen or sulfur atoms, $R^7$ is a straight or branched chain alkylene radical having

oxygen, sulfur, or

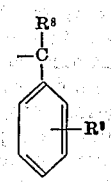

wherein $R^8$ is H or lower alkyl and $R^9$ is lower alkyl; and $n$ is an integer of 1 to 20;

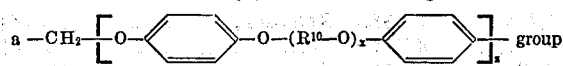 group wherein $R^{10}$ is lower alkyl, $x$ is an integer of 1-10 and $z$ is an integer of 1-10;

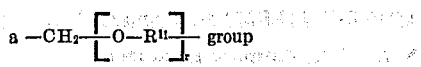 group wherein $R^{11}$ is lower alkyl and $r$ is an integer of 1-100;

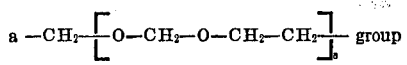 group wherein $s$ is an integer of 1 to 100; and $R^2$ is a group represented by

wherein $R^{12}$ is H or $CH_3$.

2. A reinforced composition according to claim 1 wherein the fibrous material is glass fibers which comprise 10 to 50 wt. percent of the composition.

3. A reinforced composition according to claim 1 wherein the polyolefin is polypropylene.

4. A reinforced composition according to claim 3 wherein the polymerizable compound is glycidyl acrylate or glycidyl methacrylate.

5. A process for preparing a reinforced composition comprising melt blending
(A) about 5 to 90 wt. percent of a fibrous material selected from glass and asbestos, and
(B) about 10 to 95 wt. percent of a reaction product derived from
(1) a polyolefin selected from the group consisting of homopolymers of $C_2$–$C_{10}$ alpha-olefins, copolymers of $C_2$–$C_{10}$ alpha-olefins, and mixtures thereof, and
(2) about 0.01 to about 10 wt. percent based on the polyolefin of a polymerizable compound having the formula

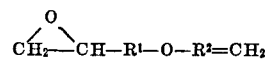

wherein
$R^1$ is a cyclic, straight or branched chain alkylene group having 1 to 20 carbon atoms;

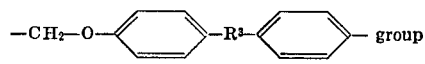 group wherein $R^3$ is a straight or branched chain alkylene radical having 1 to 10 carbon atoms, oxygen, sulfur,

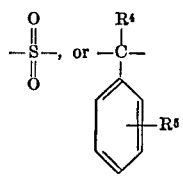

wherein $R^4$ is H or lower alkyl and $R^5$ is lower alkyl;

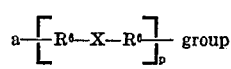 group wherein each $R^6$ is a straight or branched chain lower alkylene, X is an oxygen or sulfur atom, and $p$ is an integer of 1 to 20;

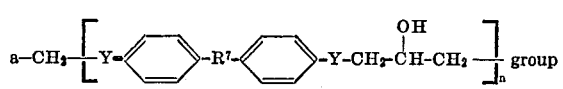 group wherein Y represents oxygen or sulfur atoms, $R^7$ is a straight or branched chain alkylene radical having 1 to 10 carbon atoms,

oxygen, sulfur or

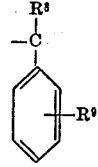

wherein $R^8$ is H or lower alkyl and $R^9$ is lower alkyl; and $n$ is an integer of 1 to 20;

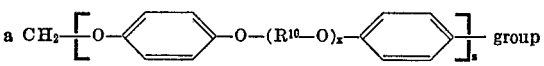 group wherein $R^{10}$ is lower alkyl, $x$ is an integer of 1-10 and $z$ is an integer of 1-10;

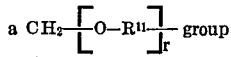 group wherein $R^{11}$ is lower alkyl, and $r$ is an integer of 1-100;

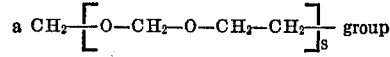 group wherein $s$ is an integer of 1 to 100; and $R^2$ is a group represented by

wherein $R^{12}$ is H or $CH_3$ and solidifying and comminuting the resulting blend.

6. A process according to claim 5 wherein the polymerizable compound is glycidyl acrylate or glycidyl methacrylate.

7. A composition comprising
(A) about 5 to 90 wt. percent of fibrous material selected from glass and asbestos, and
(B) about 10 to 95 wt. percent of a free radical ini- reaction product derived from
(1) a polyolefin selected from polypropylene, polyethylene, copolymers of propylene and ethylene, or mixture thereof, and
(2) about 0.01 to about 10 wt. percent based on the polyolefin of a polymerizable compound selected from glycidyl methacrylate or glycidyl acrylate.

8. A process for preparing a composition comprising melt blending
(A) about 5 to 90 wt. percent of fibrous material selected from glass and asbestos, and
(B) about 10 to 95 wt. percent of a free radical initiated reaction product derived from
(1) a polyolefin selected from polypropylene, polyethylene, copolymers of propylene and ethylene, or mixtures thereof, and
(2) about 0.01 to about 10 wt. percent based on the polyolefin of a polymerizable compound selected from glycidyl methacrylate or glycidyl acrylate,
and solidifying and comminuting the resulting blend.

9. A composition comprising
(A) about 5 to 90 wt. percent of fibrous material selected from glass and asbestos, and (B) about 10 to 95 wt. percent of a free radical initiated reaction product derived from polypropylene and about 0.01 to about 10 wt. percent based on the polypropylene of a polymerizable compound selected from glycidyl methacrylate or glycidyl acrylate.

10. A process for preparing a composition comprising melt blending
(A) about 5 to 90 wt. percent of fibrous material selected from glass and asbestos, and
(B) about 10 to 95 wt. percent of a free radical initiated reaction product derived from polypropylene and about 0.01 to about 10 wt. percent based on the polypropylene of a polymerizable compound selected from glycidyl methacrylate or glycidyl acrylate, and solidifying and comminuting the resulting blend.

References Cited
UNITED STATES PATENTS

| | | | |
|---|---|---|---|
| 3,416,990 | 12/1968 | Robinson, Jr. | 260—41 |
| 3,437,550 | 4/1969 | Paul, Jr. | 260—41 |
| 3,472,729 | 10/1969 | Sterman | 260—41 |
| 3,519,702 | 7/1970 | Wear et al. | 260—879 |

MORRIS LIEBMAN, Primary Examiner

S. L. FOX, Assistant Examiner

U.S. Cl. X.R.

260—41 AG